US009760063B2

(12) United States Patent
Hasegawa

(10) Patent No.: US 9,760,063 B2
(45) Date of Patent: Sep. 12, 2017

(54) ELECTRONIC TIMEPIECE

(71) Applicant: CASIO COMPUTER CO., LTD., Shibuya-ku, Tokyo (JP)

(72) Inventor: Kosuke Hasegawa, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/664,624

(22) Filed: Mar. 20, 2015

(65) Prior Publication Data

US 2015/0277387 A1 Oct. 1, 2015

(30) Foreign Application Priority Data

Mar. 26, 2014 (JP) ................................ 2014-063196

(51) Int. Cl.
*G04G 9/00* (2006.01)
*G04R 20/10* (2013.01)
(Continued)

(52) U.S. Cl.
CPC ............... *G04G 9/00* (2013.01); *G04C 17/00* (2013.01); *G04R 20/04* (2013.01); *G04R 20/10* (2013.01); *G04R 20/28* (2013.01)

(58) Field of Classification Search
CPC .......... G04G 9/00; G04G 21/00; G04G 21/08; G40R 20/04; G04R 20/28; G04R 20/10; G04C 17/00
See application file for complete search history.

(56) References Cited

U.S. PATENT DOCUMENTS 8,162,747 B2 * 4/2012 Hayasaka ............... A63F 13/10 463/24
8,953,999 B2 * 2/2015 Akiyama ............... G04R 20/02 455/3.02

(Continued)

FOREIGN PATENT DOCUMENTS

CN 102868967 A 1/2013
CN 102967863 A 3/2013

(Continued)

OTHER PUBLICATIONS

Japanese Office Action (and English translation thereof) dated Jan. 19, 2016, issued in counterpart Japanese Application No. 2014-063196.

(Continued)

*Primary Examiner* — Sean Kayes
(74) *Attorney, Agent, or Firm* — Holtz, Holtz & Volek PC

(57) ABSTRACT

An electronic timepiece including: an operating unit which performs an operation including at least one of transmission, reception and generation of electromagnetic waves of a predetermined strength or more; a display unit which displays information; a reception unit which receives a predetermined operation for switching a display content by the display unit between display contents according to a plurality of functions; an output control unit which sets the display content to be a basic display according to a predetermined basic function when the reception unit continuously receives the predetermined operation for a first predetermined time; and a setting unit which switches on/off of the operation of the operating unit between an operation allowed state and an operation prohibited state when the reception unit continuously receives the predetermined operation for a second predetermined time longer than the first predetermined time.

6 Claims, 6 Drawing Sheets

(51) Int. Cl.

| | |
|---|---|
| ***G04R 20/04*** | (2013.01) |
| ***G04C 17/00*** | (2006.01) |
| ***G04R 20/28*** | (2013.01) |

(56) References Cited

U.S. PATENT DOCUMENTS

| | | | | |
|---|---|---|---|---|
| 9,154,181 | B2 * | 10/2015 | Akiyama | G04R 20/02 |
| 9,651,922 | B2 * | 5/2017 | Hysek | G04G 21/08 |
| 2008/0004095 | A1 * | 1/2008 | Hayasaka | A63F 13/10 463/1 |
| 2009/0186633 | A1 | 7/2009 | Yonker et al. | |
| 2010/0080087 | A1 * | 4/2010 | Shupp | G01C 17/00 368/14 |
| 2013/0012181 | A1 * | 1/2013 | Jeon | H04M 1/72577 455/418 |
| 2013/0052977 | A1 * | 2/2013 | Akiyama | G04R 20/02 455/344 |
| 2013/0235704 | A1 * | 9/2013 | Grinberg | G04G 21/08 368/69 |
| 2014/0180455 | A1 * | 6/2014 | Weast | G06F 19/3481 700/91 |
| 2014/0293756 | A1 * | 10/2014 | Akiyama | G04R 20/06 368/47 |
| 2015/0103871 | A1 * | 4/2015 | Akiyama | G04R 20/02 375/147 |
| 2015/0253740 | A1 * | 9/2015 | Nishijima | G04G 9/00 368/80 |
| 2015/0253742 | A1 * | 9/2015 | Baba | G01S 19/24 368/14 |
| 2015/0277387 | A1 * | 10/2015 | Hasegawa | G04G 9/00 368/239 |

FOREIGN PATENT DOCUMENTS

| | | | |
|---|---|---|---|
| CN | 103210355 | A | 7/2013 |
| JP | 09101796 | A | 4/1997 |
| JP | 2001008833 | A | 1/2001 |
| JP | 2009229106 | A | 10/2009 |
| JP | 2011514026 | A | 4/2011 |
| JP | 2013017181 | A | 1/2013 |
| JP | 2013205363 | A | 10/2013 |

OTHER PUBLICATIONS

Japanese Office Action (and English translation thereof) dated Jun. 7, 2016, issued in counterpart Japanese Application No. 2014-063196.

Chinese Office Action (and English translation thereof) dated Jan. 26, 2017 issued in counterpart Chinese Application No. 201510119845.7.

Chinese Office Action (and English translation thereof) dated Apr. 19, 2017, issued in counterpart Chinese Application No. 201510119845.7.

* cited by examiner

ELECTRONIC TIMEPIECE

BACKGROUND OF THE INVENTION

1. Field of the Invention

The present invention relates to an electronic timepiece that has a wireless communication function and a radio wave reception function.

2. Description of Related Art

In recent years, there have been electronic timepieces that have wireless communication functions such as Bluetooth (registered trademark) and have functions of transmitting and receiving radio waves. There have also been electronic timepieces which can receive radio waves from satellites in positioning systems such as GPSs (Global Positioning Systems). The electronic timepieces provide various functions to users by the radio wave transmission and reception functions.

Currently, electronic devices having functions of performing wireless communication with other electronic devices fall under the restricted-use electronic device which is possibly detrimental to aircraft operational safety, and thus, the use thereof is banned during the closing of door in aircrafts. Accordingly, users need to turnoff such electronic devices when boarding aircrafts.

However, electronic timepieces which are constantly used are not estimated to be turned off, and thus, there is a problem that the users forget to turn off operations of radio wave transmission units. With respect to this, Japanese Unexamined Patent Application Publication No. 2011-514026 (corresponding to US 2009/0186633A1) discloses a technique of registering positions of airports in advance and automatically switching an electronic device to an airplane mode in an airport, airplane and such like on the basis of positioning data obtained by using the positioning satellites. Japanese Patent Application Laid Open Publication No. 2013-17181 (corresponding to US 2013/0012181 A1) discloses a technique of receiving radio waves from positioning satellites, detecting the change in position and speed immediately before takeoff and immediately after landing, and setting and releasing the airplane mode automatically.

However, GPS receivers are electronic devices banned on takeoff and landing since they generate strong electromagnetic waves during use, and there is a difficulty in using the positioning systems at present. Furthermore, in a case of such automatic switching, there is a problem that the communication function is not turned off when necessary information for the determination is not acquired due to the failure of radio wave reception and such like. On the other hand, in a case where the user manually operates to turn off the communication function, conventionally, conventionally, there have been cases where the user cannot switch functions promptly when necessary due to the troublesome operation.

The present invention relates to an electronic timepiece which enables a user to switch on and off a communication function and a function of generating electromagnetic waves easily and rapidly.

SUMMARY OF THE INVENTION

According to one aspect of the present invention, there is provided an electronic timepiece including: an operating unit which performs an operation including at least one of transmission, reception and generation of electromagnetic waves of a predetermined strength or more; a display unit which displays information; a reception unit which receives a predetermined operation for switching a display content by the display unit between display contents according to a plurality of functions; an output control unit which sets the display content by the display unit to be a basic display according to a predetermined basic function when the reception unit continuously receives the predetermined operation for a first predetermined time; and a setting unit which switches on/off of the operation of the operating unit between an operation allowed state and an operation prohibited state when the reception unit continuously receives the predetermined operation for a second predetermined time which is longer than the first predetermined time.

BRIEF DESCRIPTION OF THE DRAWINGS

The above and other objects, advantages and features of the present invention will become more fully understood from the detailed description given hereinafter and the appended drawings which are given byway of illustration only, and thus are not intended as a definition of the limits of the present invention, and wherein.

DETAILED DESCRIPTION OF THE PREFERRED EMBODIMENT

Embodiments of the present invention will now be described with reference to the accompanying drawings.

Figure 1:
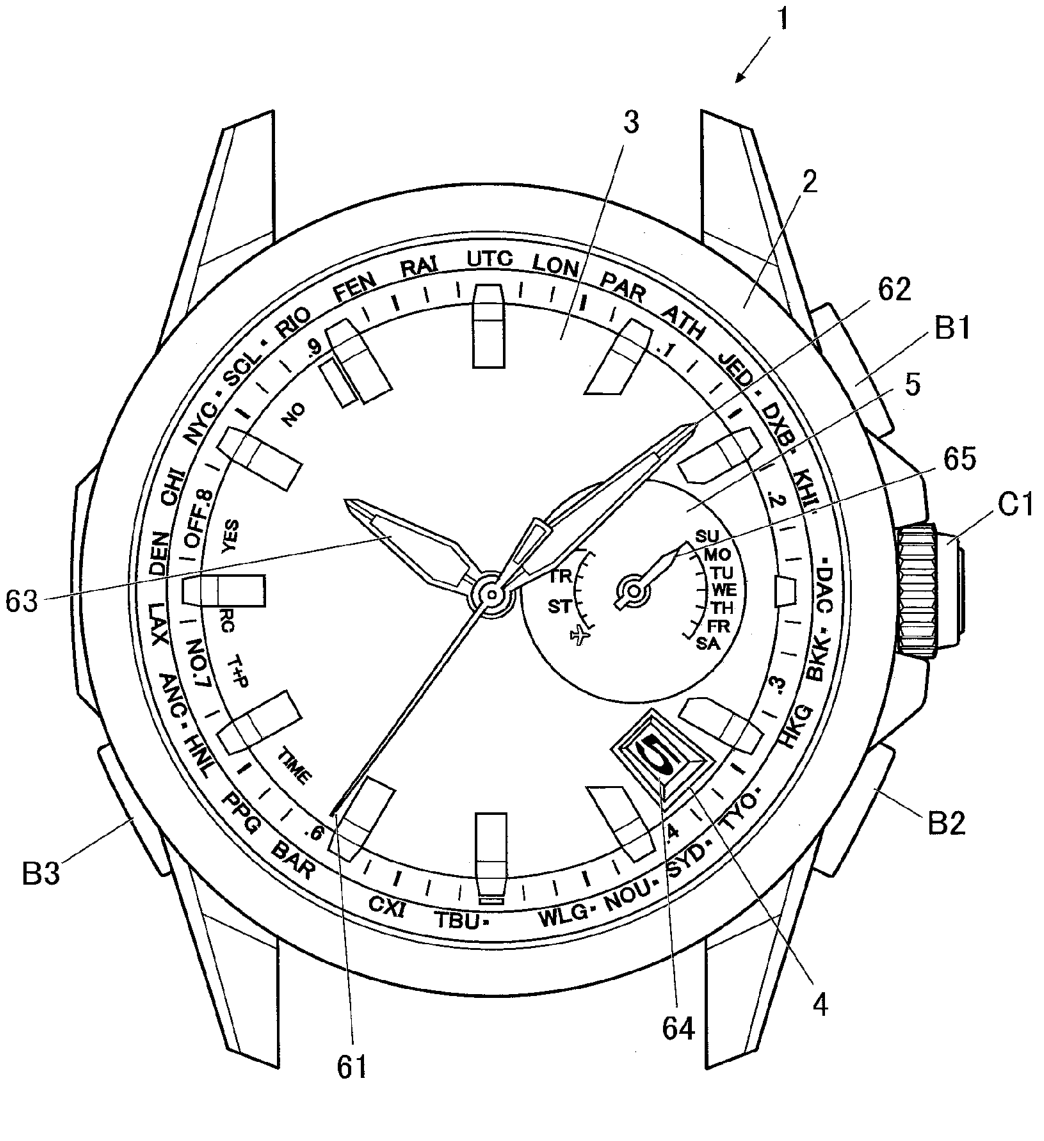
FIG. 1 is a front view showing an embodiment of an electronic timepiece of the present invention.

FIG. 1 is a front view illustrating an analog electronic timepiece 1 which is an embodiment of an electronic timepiece of the present invention.

The analog electronic timepiece 1 includes a casing 2 that accommodates components; a clock face 3 that is disposed in the casing 2 and has an exposed external surface (exposed surface); a transparent member (windproof glass) (not shown) that covers the exposed surface of the clock face 3; a second hand 61, a minute hand 62 and an hour hand 63 that revolve around a rotary axis at the substantial center of the clock face 3 over the substantially entire surface of the clock face 3 between the clock face 3 and the windproof glass and point to markers and numbers provided near the outer edge of the clock face 3; a date wheel 64 that is disposed parallel to the clock face 3 on the side thereof opposite to the exposed surface and rotates to expose a mark through an opening 4 provided at the four-thirty position on the clock face 3; a small window 5 that is provided at the three o'clock position on the clock face 3 and a mode hand 65 (hand) that rotates in the small window 5; and a crown C1 and push-button switches B1, B2 and B3 that are disposed on the lateral side of the casing 2 with respect to the exposed surface of the clock face 3.

The second hand 61, minute hand 62 and hour hand 63 (also referred to as hands 61 to 63) usually display time by indicating the second, minute, and hour, respectively, of the time. The date wheel 64 has numbers indicating dates printed in sequence on the circumference at equal intervals.

One of these numbers is exposed through the opening 4 to indicate the date. In the analog electronic timepiece 1 of the embodiment, the hands 61 to 63 are also used for display and setting according to various functions.

The mode hand 65 points to one of the seven marks (day-of-week marks) provided on the three o'clock side of the small window 5 to indicate the day of week. The mode hand 65 points to one of the three marks (function marks) on the upper side (12 o'clock side) among four marks provided on the nine o'clock side of the small window 5 to indicate the type of the function mode for which the hands 61 to 63 perform display and operations for the display are received. In the analog electronic timepiece 1, the function mode includes a stopwatch mode, a timer mode and an alarm setting mode (alarm mode), which are respectively indicated by the marks "ST", "TR" and "AL". A setting according to on/off of transmission and reception of radio waves for wireless communication (also called airplane mode) can also be used in parallel to these function modes, and a mark (airplane mark) in an airplane shape which is pointed to as a mark (prohibition mark) indicating prohibition when the transmission and reception of the radio waves for the wireless communication are prohibited is provided on the lower side (six o'clock side) of the function mode marks.

The clock face 3, hands 61 to 63, date wheel 64 and mode hand 65 form the display unit.

The crown C1 and the push-button switches 31, B2 and B3 each receives user's input operation. The crown C1 can be pulled out from the casing 2 in two steps. The crown C1 is pulled out and turned to switch various settings and change values. The push-button switches B1 to B3 are each pushed to receive the type of function mode and operation commands assigned to each operation thereof. Among them, the push-button switch B3 is used for switching the function mode to be displayed.

Figure 2:
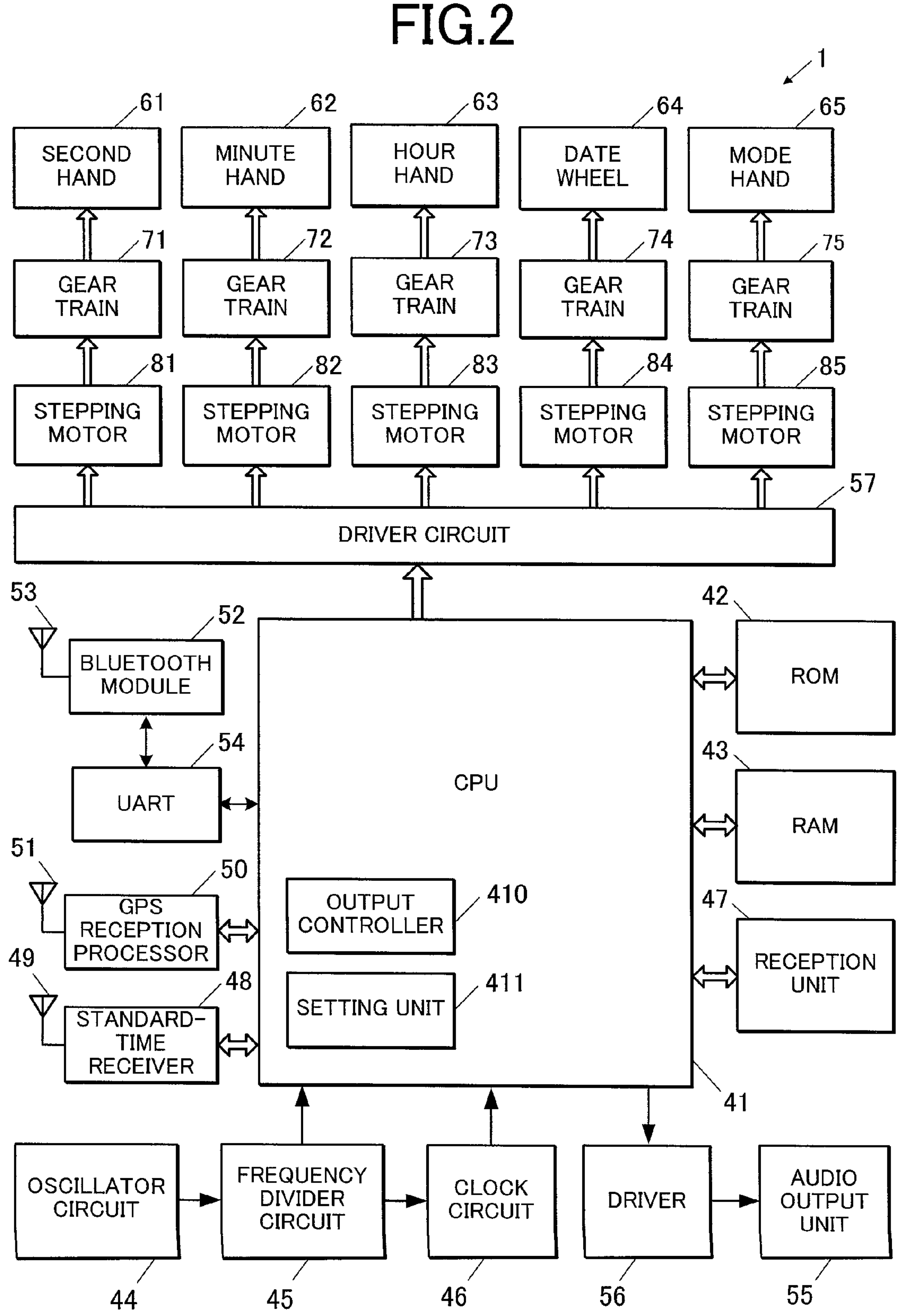
FIG. 2 is a block diagram showing the internal configuration of the electronic timepiece.

FIG. 2 is a block diagram illustrating the internal configuration of the analog electronic timepiece 1.

The analog electronic timepiece 1 includes a central processing unit (CPU) 41 (output control unit 410, a setting unit 411), a read only memory (ROM) 42, a random access memory (RAM) 43, an oscillator circuit 44, a frequency divider circuit 45, a clock circuit 46, a reception unit 47, a standard wave receiver 48, an antenna 49 thereof, a GPS reception processor 50, an antenna 51 thereof, a Bluetooth module 52, an antenna 53 thereof, a UART 54 (Universal Asynchronous Receiver/Transmitter), an audio output unit 55, a driver thereof 56, a driver circuit 57, the hands 61 to 63, a date wheel 64, a mode hand 65, gear trains 71 to 75, and stepping motors 81 to 85.

The CPU 41 carries out calculation processes and comprehensively controls the entire operation of the analog electronic timepiece 1. The CPU 41 controls the hand movement to indicate the current date and time, operates the standard wave receiver 48 to receive data and calculate the date and time from the received data, or actuates the GPS reception processor 50 to acquire information on date and time. The CPU 41 actuates the Bluetooth module 52 to communicate with an external electronic device and transmit and receive information.

The ROM 42 stores programs and setting data for the various control processes carried out by the CPU 41.

The RAM 43 provides a work space for the CPU 41 and stores temporary data. The RAM 43 also stores the history of acquired information on date, time, and position, data on city setting and the hand positions, communication data such as identification information of the external electronic device to perform Bluetooth communication, setting information received from the external electronic device and such like.

The oscillator circuit 44 generates and outputs predetermined frequency signals. The oscillator circuit 44 includes, for example, a crystal oscillator.

The frequency divider circuit 45 divides a frequency signal output from the oscillator circuit 44 into signals having frequencies usable in the CPU 41 and the clock circuit 46. The frequencies of the output signals may be varied in response to control signals from the CPU 41.

The clock circuit 46 adds the frequency-divided signal from the frequency divider circuit 45 to the initial value indicating a predetermined date and time so as to count the current date and time. The date and time counted by the clock circuit 46 can be corrected by the control signals from the CPU 41.

The reception unit 47 receives input operations from the user. The reception unit 47 includes the push-button switches B1, B2 and B3 and the crown C1. When the push-button switches B1, B2 and B3 are pushed, and the crown C1 is pulled, pushed or turned while being pulled, electrical signals corresponding to the operations are output to the CPU 41.

The standard wave receiver 48 receives the radio waves in a long wavelength range via the antenna 49, demodulates the amplitude-modulated time signal output (TCO) of the standard radio waves, performs various processes for improving receiving sensitivity, digitizes analog signals with a predetermined sampling frequency, and outputs the digitized signal to the CPU 41. The tuning frequency in a long wavelength range by the standard wave receiver 48 is varied through the control of the CPU 41 in response to the transmission frequency from the transmitter station of the standard frequency which is the reception target.

The GPS reception processor 50 receives transmitted radio waves in the L1 band (1.57542 GHz for a GPS satellite) with a spread spectrum from a positioning satellite, which in this case is a positioning satellite (GPS satellite) in a global positioning system (GPS) via the antenna 51, and decodes or deciphers the signals (navigation message data) through the demodulation of the transmitted radio waves. Various calculation processes are carried out depending on the content of the deciphered navigation message data as needed, and data in accordance with the request from the CPU 41 with a predetermined format is output to the CPU 41. The operation of the GPS reception processor 50 is independently controlled to be turned on and off by the CPU 41. If the operation of the GPS reception processor 50 is not required or the operation is prohibited, the analog electronic timepiece 1 can cut off the power supply to the GPS reception processor 50.

The Bluetooth module 52 is a control module to perform Bluetooth communication with an external electronic device via the antenna 53. Processing such as serial/parallel conversion is performed at UART 54 with respect to the data transmitted from the CPU 41, the data is modulated by the Bluetooth module 52 and transmitted to the external device. The data received from the Bluetooth module 52 via the antenna 53 is demodulated, thereafter subject to the serial/parallel conversion at the UART 54 and output to the CPU 41. The operation of Bluetooth module 52 is controlled to be turned on and off independently by the CPU 41. If the Bluetooth communication is not performed or the communication is prohibited, the analog electronic timepiece 1 can cut off the power supply to the Bluetooth module 52.

The GPS reception processor 50 and the Bluetooth module 52 form an operating unit.

The audio output unit 55 inputs a predetermined drive voltage signal to piezoelectric element to generate a beep sound (notification sound), for example. The driver 56 outputs the drive voltage signal for operating the audio output unit 55 to the audio output unit 55 in response to the control signal from the CPU 41. The audio output by the audio output unit 55 is set to be turned on and off by user's operation to the reception unit 47.

As the battery for supplying electric power necessary for the electronic timepiece in the embodiment, a solar battery and a secondary battery are used, for example. Alternatively, a button type dry cell which is detachable to be replaced can be used as a battery. In a case of supplying a plurality of different voltages, for example, a switching power source can be used to convert the voltages to a predetermined voltage to be output.

The stepping motor 81 turns the second hand 61 via the gear train 71, which consists of an array of multiple gears. The stepping motor 82 turns the minute hand 62 via the gear train 72. The stepping motor 83 turns the hour hand 63 via the gear train 73. The stepping motor 84 turns the date wheel 64 via the gear train 74. The stepping motor 85 turns the mode hand 65 via the gear train 75.

The numbers of rotations of the hands per one step of the stepping motors 81 to 85 are determined on the basis of the array of gears in the respective gear trains 71 to 75. For example, here, the gear trains 71 and 75 are configured so that the second hand 61 and the mode hand 65 turn by six degrees per step of the stepping motors 81 and 85, respectively. The gear trains 72 and 73 are configured so that the minute hand 62 and the hour hand 63 turn once per step of the stepping motors 82 and 83, respectively. The stepping motor 84 also changes the date indicated by the date mark on the date wheel 64 to be exposed through the opening 4 by one day via 150 steps drive, for example.

Though not especially limited, the hands 61 to 63, the date wheel 64 and the mode hand 65 can turn by 90 pulses per second (pps) in the clockwise direction and 32 pps in the counterclockwise direction.

The driver circuit 57 outputs driving pulses of predetermined voltages to the stepping motors 81 to 85 in accordance with the control signals from the CPU 41. The driver circuit 57 can vary the length of the driving pulses (pulse width) in response to the condition of the analog electronic timepiece 1 and such like. If control signals for simultaneously driving a plurality of hands are received, the driver circuit 57 can slightly shift the output timings of the driving pulses so as to reduce the peak value of the load.

Next, operations for setting and releasing the prohibition on wireless communication in the analog electronic timepiece 1 in the embodiment will be described.

Figure 3:
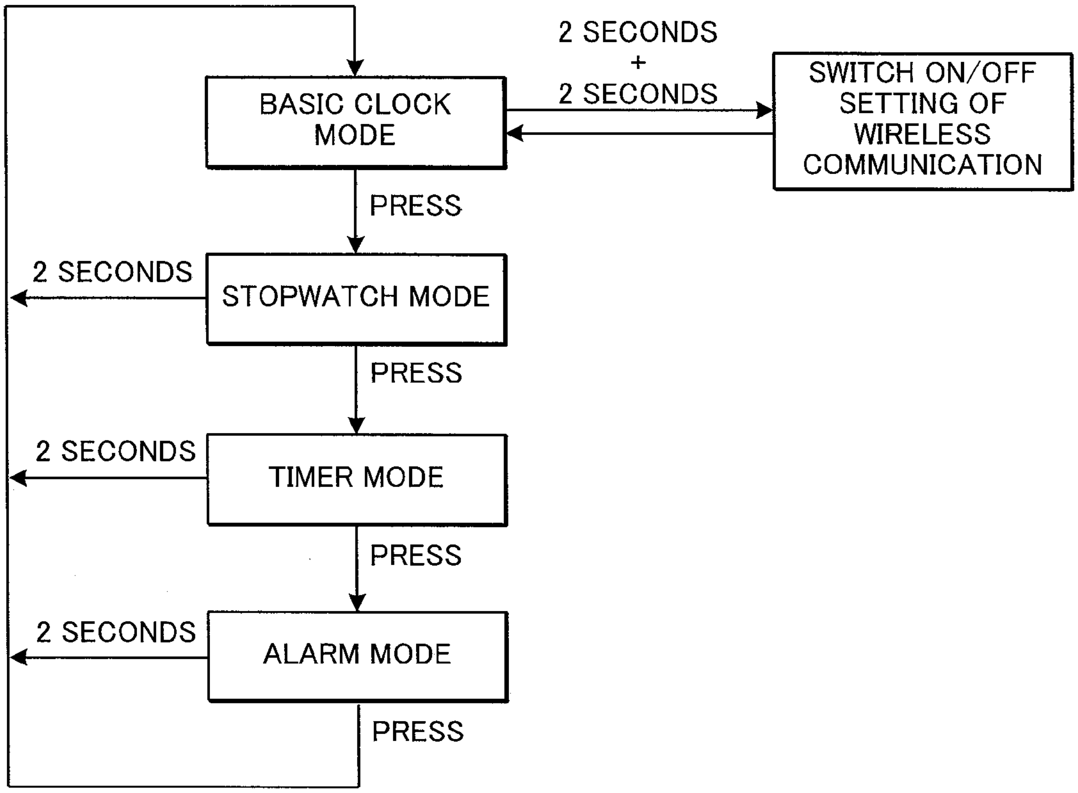
FIG. 3 is a view for explaining switching of function mode.

FIG. 3 is a view for explaining the switching of function mode.

In the analog electronic timepiece 1 of the embodiment, the function mode to be displayed is switched by pressing the push-button switch B3. Here, the function mode is switched to the basic clock mode, stopwatch mode, timer mode and alarm setting mode in order by one press of the push-button switch B3. When the push-button switch B3 is pressed again in the alarm setting mode, the function mode is returned to the basis clock mode. A counting operation of elapsed time measured in the stopwatch mode, timer mode and such like including the counting of date and time in the basic clock mode is continued even when the displayed function mode is changed. At this time, in a case where the audio output from the audio output unit 55 and such like is set to be allowed, the audio indicating the change, for example, a short (0.1 seconds, for example) beep sound is output once.

By the push-button switch B3 being continuously pressed for 2 seconds (first predetermined time), the analog electronic timepiece 1 directly shifts to the basic clock mode (basic function) whichever function mode is being displayed. At this time, in a case where the audio output from the audio output unit 55 is set to be allowed, audio different from the audio indicating the above change, for example, continuous two outputs of a short beep sound (for example, at intervals of 0.3 seconds) notifies the direct shift to the basic clock mode.

In the analog electronic timepiece 1 in the embodiment, the setting regarding whether or not to allow wireless communication (on/off of operation) that generates strong (with a predetermined strength) electromagnetic waves is also switched alternately between an operation allowed state and an operation prohibited state by continuously pressing the push-button switch B3 for 4 seconds (second predetermined time). That is, in the analog electronic timepiece 1, the function mode is changed to the next mode when the push-button switch B3 is pressed, the function mode is shifted to the basic clock mode when the push-button switch B3 is pressed for 2 seconds, and the setting regarding on/off of the wireless communication is switched when the push-button switch B3 is pressed for 4 seconds. Accordingly, after the on/off of the wireless communication is switched, the function mode is surely changed to the basic clock mode. At this time, in a case where the audio output from the audio output unit 55 is set to be possible, audio of a pattern further different from the above 2 pattern audios, for example, a long (for example, 0.5 seconds) beep sound is output once to notify the switching of the setting regarding the on/off of the wireless communication.

Figure 4:
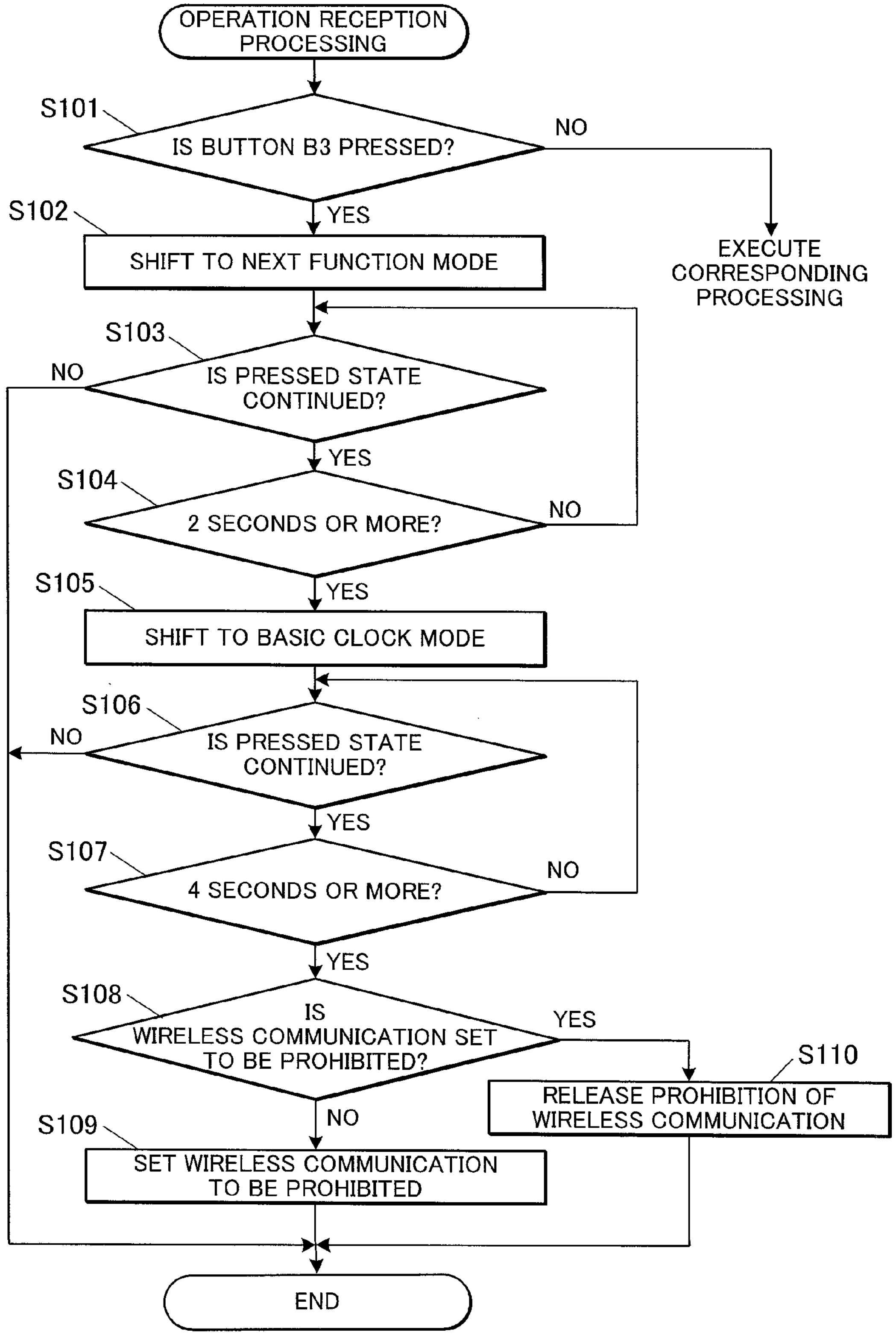
FIG. 4 is a flowchart showing a control procedure of processing according to the switching of function mode.

FIG. 4 is a flowchart showing a control procedure by the CPU 41 of processing according to the switching of function mode in the operation reception processing to be executed in the analog electronic timepiece 1 of the embodiment.

The operation reception processing starts by the user inputting, to the CPU 41, an input signal according to a switch operation of any one of the push-button switches B1 to B3 and crown C1 in the reception unit 47.

When the operation reception processing starts, the CPU 41 first determines whether the push-button switch B3 is pressed (step S101). Alternatively, the CPU 41 may simply determine which switch is operated. At this time, the CPU 41 starts counting the duration time from the operation of the switch (or the duration time from the start of operation reception processing). If it is not determined that the push-button switch B3 is pressed (if it is determined that a switch other than the push-button switch B3 is operated) (step S101; NO), the CPU 41 executes the processing according to the operated switch, the function mode and the operation state.

If it is determined that the push-button switch B3 is pressed (step S101; YES), the CPU 41 shifts the current function mode to the next function mode (step S102). The CPU 41 changes the display content to the content according to the next function mode.

The CPU 41 determines whether the push-button switch B3 has been continuously pressed (step S103). If it is not determined that the push-button switch B3 has been continuously pressed (if it is determined that the bush-button switch B3 is not pressed any longer) (step S103; NO), the CPU 41 ends the operation reception processing. If it is determined that the push-button switch B3 has been continuously pressed (step S103; YES), the CPU 41 determines whether or not the duration time counted from step S101 is 2 seconds or more (step S104). If it is not determined that the duration time counted from step S101 is 2 seconds or more (step S104; NO), the processing of CPU 41 returns to step S103.

If it is determined that the push-button switch B3 is pressed (step S101; YES), the CPU 41 may shift the processing to step S103 without processing in step S102, and if it is not determined that the push-button switch B3 has been continuously pressed (step S103; NO), the CPU 41 may shift from the current function mode to the next function mode (step S102).

If it is determined that the duration time counted from step S101 is 2 seconds or more (step S104; YES), the CPU 41 shifts the function mode to the basic clock mode (step S105). The CPU 41 outputs the control signal to the driver circuit 57 to change the content displayed by the hands 61 to 63 to the basic display in the basic clock mode, and shifts the mode hand 65 to the position of the current day of the week.

The CPU 41 determines whether the pressed state is continued (step S106). If it is not determined that the pressed state is continued (step S106; NO), the CPU 41 ends the operation reception processing.

If it is determined that the pressed state is continued (step S106; YES), the CPU 41 determines whether or not the duration time of the pressed state is 4 seconds or more (step S107). If it is not determined that the duration time of the pressed state is 4 seconds or more (step S107; NO), the processing of CPU 41 returns to step S106.

If it is determined that the duration time of the pressed state is 4 seconds or more (step S107; YES), the CPU 41 determines whether wireless communication is currently set to be prohibited (step S108). If it is determined that wireless communication is currently set to be prohibited (step S108; YES), the CPU 41 releases the setting of prohibiting the wireless communication (step S110). The CPU 41 shifts the mode hand 65 to the position of the current day of week. Then, the CPU 41 ends the operation reception processing.

If it is not determined that wireless communication is currently set to be prohibited (step S108; NO), the CPU 41 sets prohibition on wireless communication (step S109). The CPU 41 outputs the control signal to the driver circuit 57 to shift the mode hand 65 to the position of airplane mark. At this time, if the analog electronic timepiece 1 is receiving radio waves from the GPS satellites or in Bluetooth communication with another electronic device, the CPU 41 ends the radio wave reception or the communication operation. Then, the CPU 41 ends the operation reception processing.

FIGS. 5A to 5E) are views showing display by the mode hand 65.

Figure 5A:
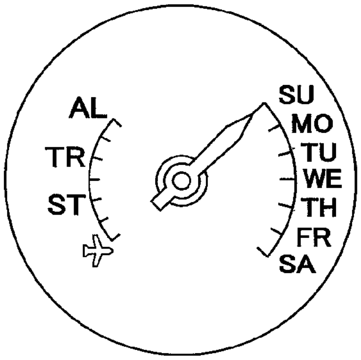
FIGS. 5A to 5D are views showing display by a mode hand.

As shown in FIG. 5A, in the basic clock mode, the mode hand 65 points to one of the day-of-week marks in the small window 5. Here, the mode hand 65 points to the day-of-week mark "SU" to indicate the basic clock mode and Sunday.

On the other hand, when the display content is according to any function of the stopwatch mode, timer mode and the alarm setting mode, the mode hand 65 points to the function marks "ST", "TR" and "AL" in the small window 5, respectively. For example, in the stopwatch mode, as shown in FIG. 5B, the mode hand 65 points to the function mark "ST". In the meantime, the day of week is not displayed.

Figure 5C:
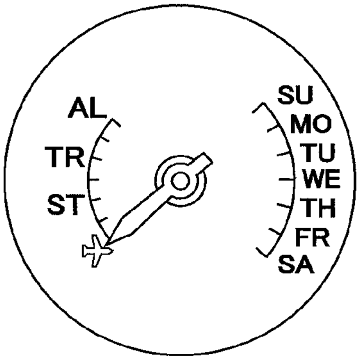
Figure 5B:
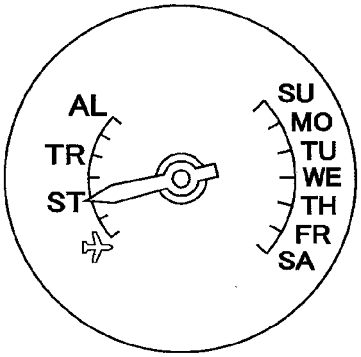

As shown in FIG. 5C, when wireless communication is set to be prohibited (airplane mode), in the basic clock mode, the mode hand 65 points to the airplane mark instead of day-of-week mark. As mentioned above, when the prohibition on wireless communication is set or released, the mode is surely to shift to the basic clock mode once, and thus, whether the prohibition on wireless communication is set or released is indicated by which of the day-of-week mark and airplane mark is indicated by the mode hand 65.

Figure 5D:
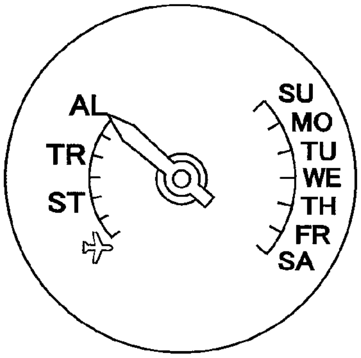

Even while the wireless communication is set to be prohibited, the display and operation are possible in each of the stopwatch, timer and alarm setting modes. If the analog electronic timepiece 1 is shifted to the display according to one of the function modes while setting prohibition on wireless communication, the corresponding function mark is indicated by the mode hand 65. For example, as shown in FIG. 5D, the mark "AL" is indicated by the mode hand 65 in the alarm setting mode. In the meantime, whether the prohibition on wireless communication is set is not displayed.

MODIFICATION EXAMPLE

Figure 6:
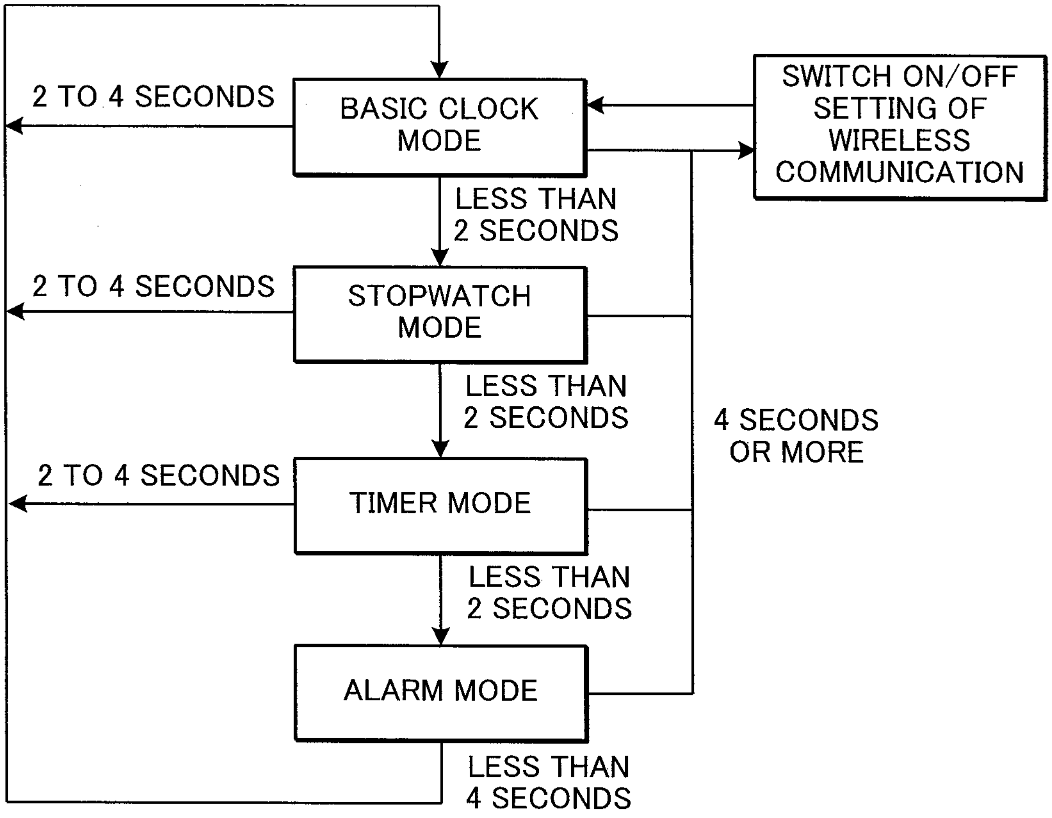
FIG. 6 is a view for explaining a modification example according to the switching of function mode.

FIG. 6 is a view for explaining a modification example according to the switching of function mode in the analog electronic timepiece 1 in the embodiment.

In the analog electronic timepiece 1 of the modification example, on the basis of the operation signal output from the reception unit 47, the CPU 41 performs operation (release detection) by detecting the timing when the operation signal from the reception unit 47 is ended, that is, when the pressing of the push-button switches B1 to B3 is finished.

In the basic clock mode, when the pressing of the push-button switch B3 is finished, the pressing duration time counted during the pressing is obtained. If the duration time is less than 2 seconds, the mode shifts to the stopwatch mode, and if the duration time is 2 seconds to 4 seconds, the mode remains basic clock mode, that is, switching of mode is not performed, and if the duration time is 4 seconds or more, the setting according to on/off of wireless communication is switched.

Similarly, if the duration time is less than 2 seconds in the stopwatch mode, timer mode and alarm setting mode, the mode is shifted to the timer mode, alarm setting mode and basic clock mode, respectively. If the duration time is 2 seconds to 4 seconds, the mode is shifted to the basic clock mode in any mode. If the duration time is 4 seconds or more, in any mode, the setting according to the on/off of the wireless communication is switched and the mode is shifted to the basic clock mode.

In these cases, at the point when the 4 seconds elapsed, the setting regarding on/off of wireless communication may be switched and the mode may be shifted to the basic clock mode regardless of whether the push-button switch B3 is continuously pressed for more than 4 seconds. Similarly, when the user wishes to simply return the mode to the basic clock mode without switching on/off of the wireless communication, in order to avoid the work of counting the duration time from 2 seconds to 4 seconds to press the push-button switch B3, the release detection operation may be performed only for the normal pressing operation of less than 2 seconds, and for the long pressing of more than 2 seconds, the operation may be performed at the point when the corresponding time elapsed.

In such way, in a case of switching the function mode by release detection, unnecessary switching operation to the next function mode is not generated before switching the setting of on/off of the wireless communication.

As described above, the analog electronic timepiece 1 in the embodiment includes the Bluetooth module 52 which transmits electromagnetic waves of a predetermined strength or more in Bluetooth communication, the GPS reception processor 50 which generates electromagnetic waves when operating, the hands 61 to 63 which rotate over the clock face 3, the date wheel 64, the mode hand 65 which rotates in the small window 5, the reception unit 47 which receives pressing operation of the push-button switch B3 for switching contents displayed by the hands between display contents according to a plurality of functions, and the CPU 41. The CPU 41 as an output control unit 410 sets the display contents by hands to the basic clock mode when the push-button switch B3 is continuously pressed for 2 seconds. The CPU 41 as the setting unit 411 switches the setting according to on/off of the operations of the Bluetooth module 52 and the GPS reception processor 50 between the operation allowed state and the operation prohibited state when the push-button switch is pressed for 4 seconds.

Accordingly, troublesome operations which are different according to the user's operation state are not necessary, and it is possible to switch on and off the communication function and the function of receiving and generating radio waves easily and rapidly by a direct operation. It is also possible to avoid problems caused when the user cannot switch the functions on and off rapidly.

The CPU 41 as the output control unit 410 makes the mode hand 65 point to the airplane mark indicating the setting of airplane mode (communication operation prohibited) in the basic clock mode, while the CPU 41 can notify the user that the airplane mode is not set by pointing to any one of the day-of-week marks when the airplane mode is not set. Especially, when the switching of on/off of the communication operation is set, the display is surely in the basic clock mode regardless of the display state before, and thus, the user can visually confirm immediately and surely whether the intended switching was appropriately performed.

Especially, in the analog electronic timepiece 1 which performs display by the hands 61 to 64, the date wheel 64 and the mode hand 65 rotating with respect to the clock face 3, when each function is performed, the mode hand 65 points to the function mark indicating the function, and when the display according to the basic clock mode is performed, the hand points to the airplane mark or a day-of-week mark, and thereby it is possible to perform necessary display efficiently with a single hand. Especially, by pointing to the airplane mark instead of a day-of-week mark which is relatively not needed to be constantly displayed in the basic clock mode, display according to on/off of the function mode and communication operation in the analog electronic timepiece 1 is accurately performed while minimizing the influence, and the easier operation is possible while avoiding the situation in which the user cannot grasp the status of analog electronic timepiece 1.

The analog electronic timepiece 1 also includes the audio output unit 55 which outputs a predetermined notification sound. When switching on/off of the operation, the CPU 41 makes the audio output unit 55 perform notification by outputting a single short (less than 0.1 seconds) beep sound when the display content is switched in order, for example. On the other hand, when switching on/off setting of wireless communication operation, the CPU 41 makes the audio output unit 55 output notification sound with an audio output pattern different from the single sound notification, for example, a long sound of 0.5 seconds or more.

Accordingly, it is possible to acquire which processing is currently performed according to the elapsed time, and the user only needs to press the push-button switch B3 until he or she hears the long sound on the basis of the notification sound. That is, the user does not need to consider the pressing time while watching the operation of mode hand 65.

The present invention is not limited to the above embodiments and various changes can be made.

For example, in the above embodiments, the analog electronic timepiece 1 is cited as an example; however, a digital electronic timepiece including a digital display screen may be used. In this case, the display for indicating the airplane mode may be performed in the display area of the day-of-week, or a segment indicating the airplane mode may be separately prepared to be controlled to light up or off so that the segment can be displayed in parallel to the day-of-week display.

Similarly, the analog electronic timepiece may also simultaneously display the function mode and the airplane mode in a case where a hand indicating the function mode and a hand indicating the airplane mode are separately provided. Alternatively, an electronic timepiece using both of the hand display and the digital display screen can perform display according to the setting of airplane mode appropriately by either one depending on a design and a function.

In the above embodiments, the on/off settings of the function mode and the radio wave reception operation are performed on the basis of the time for which the push-button switch B3 is pressed; however, in a case where the timepiece has another easy operation, for example, a touch panel function, these settings may be performed on the basis of the touch time that a predetermined position is touched.

In the embodiments, the Bluetooth communication and the radio wave reception by the GPS reception processor from the positioning satellites are prohibited; however, other communication methods can be appropriately used. At this time, as for the reception of long wavelength radio waves that standard radio waves are transmitted and infrared ray communication, they are not the reception prohibition target in the airplane; however, they may be prohibited in the airplane mode together with the Bluetooth module 52 and the GPS reception processor 50. Similarly, the present invention can be used for switching on/off the operation status of UWB (IEEE802.15.3a), Zigbee (registered trademark, IEEE802.15.4), wireless LAN (IEEE802.11n) and such like. Furthermore, as for units that the turn-off operation is not essential among the communication units and the receivers, the user may be able to manually set in advance which unit to turn off in the airplane mode. Also in a case where the timepiece has a function corresponding to an electronic device which generates electromagnetic waves of a predetermined strength, for example, a charging function using an external charger (device using electromagnetic induction or the like), the user can set the operation to be prohibited.

In the above embodiments, the function mode to be switched by the push-button switch B3 is classified to the basic clock mode, stopwatch mode, timer mode and alarm setting mode; however, the function mode may include other modes. At this time, in a case where the function mode includes a mode according to positioning and a mode according to the operation of Bluetooth communication, while the communication operation is set to be prohibited, these modes may be skipped so as not to be selected, or only the history display and various setting operations may be set to be possible.

In the above embodiments, the basic function is the basic clock mode for displaying time of a set city; however, in a case where another function mode is mainly used, for example, in a stopwatch having a time display (clock) function, it is possible to shift to the stopwatch function and further switch on/off the wireless communication operation by a long pressing.

The other specific details such as the configuration, location and control procedures shown in the above embodiments can be appropriately changed within the scope of the present invention.

Though several embodiments of the present invention have been described above, the scope of the present invention is not limited to the above embodiments, and includes the scope of inventions, which is described in the scope of claims, and the scope equivalent thereof.

The entire disclosure of Japanese Patent Application No. 2014-063196 filed on Mar. 26, 2014 including description, claims, drawings, and abstract are incorporated herein by reference in its entirety.

What is claimed is:

1. An electronic timepiece comprising:

an operating unit which performs an operation including at least one of transmission, reception, and generation of electromagnetic waves of at least a predetermined strength;

a display unit which displays information;

a reception unit which receives a predetermined operation for switching a display content of the display unit between a plurality of function modes, the plurality of function modes including a basic clock mode; and a processor which (i) sets the display content of the display unit to be the basic clock mode regardless of a function mode which is currently being displayed on the display unit when the reception unit continuously receives the predetermined operation for a first predetermined time, and (ii) switches an on/off state of the operation of the operating unit between an operation allowed state and an operation prohibited state when the reception unit continuously receives the predetermined operation for a second predetermined time which is longer than the first predetermined time.

2. The electronic timepiece according to claim 1, wherein the processor controls the display unit to perform display according to the on/off state of the operation of the operating unit at least while the basic clock mode is being performed.

3. The electronic timepiece according to claim 2, wherein the display unit includes:

a clock face which is provided with function marks indicating respective ones of the plurality of functions and a prohibition mark indicating the operation prohibited state; and a hand which is disposed so as to be rotatable with respect to the clock face, and wherein:

(i) when the display unit does not perform the basic clock mode, the processor controls the hand to point to a function mark corresponding to a function that corresponds to the display content being displayed on the display unit, and (ii) when the display unit performs the basic clock mode, the processor performs display for indicating the operation prohibited state by controlling the hand to point to the prohibition mark.

4. The electronic timepiece according to claim 3, further comprising:

an audio output unit which outputs a predetermined notification sound, wherein, when the on/off state of the operation of the operating unit is switched, the processor controls the audio output unit to output a notification sound having a pattern different from a pattern of a notification sound which is output when the display content by the display unit is switched.

5. The electronic timepiece according to claim 2, further comprising:

an audio output unit which outputs a predetermined notification sound, wherein, when the on/off state of the operation of the operating unit is switched, the processor controls the audio output unit to output a notification sound having a pattern different from a pattern of a notification sound which is output when the display content by the display unit is switched.

6. The electronic timepiece according to claim 1, further comprising:

an audio output unit which outputs a predetermined notification sound, wherein, when the on/off state of the operation of the operating unit is switched, the processor controls the audio output unit to output a notification sound having a pattern different from a pattern of a notification sound which is output when the display content by the display unit is switched.

* * * * *